3,076,822
4-METHYL-3-OXO-Δ⁴ STEROIDS AND METHODS FOR PREPARING SAME
David Neville Kirk and Vladimir Petrow, London, England, assignors to The British Drug Houses Limited, London, England, a company of Great Britain
No Drawing. Filed Nov. 16, 1959, Ser. No. 852,972
Claims priority, application Great Britain Nov. 19, 1958
5 Claims. (Cl. 260—397.4)

This invention is for improvements in or relating to organic compounds and has particular reference to a new method for the preparation of 4-methyl-3-oxo-Δ⁴-steroids.

It is an object of the invention to provide a new method for the preparation of 4-methyl-3-oxo-Δ⁴-steroids utilising as starting material a 4-organothiomethyl-3-oxo-Δ⁴-steroid. The 4-methyl-3-oxo-Δ⁴-steroids are useful on account of their biological properties, or as intermediates in the preparation of compounds having valuable biological properties. Thus, for example, 4-methyltestosterone has a more favourable anabolic/androgenic index than has testosterone, while 4-methylprogesterone, for example, has progestational activity.

According to the present invention there is provided a method for the preparation of 4-methyl-3-oxo-Δ⁴-steroids which comprises reacting a 4-organothiomethyl-3-oxo-Δ⁴-steroid with a reducing agent to achieve reductive fission of the sulphur-containing group.

The reducing agent is preferably Raney nickel treated in the manner hereinafter described. Zinc dust/alkali metal hydroxide represents another convenient reducing agent.

The invention also provides the following new 4-methyl-3-oxo-Δ⁴-steroids:

2α:4-dimethyltestosterone, its acetate, propionate, β-phenylpropionate, p-chlorophenoxy acetate, which are of value on account of their favourable anabolic/androgenic index.

4:6α - dimethyltestosterone, its 17 - acetate, propionate, β-phenylpropionate, which are of value on account of their favourable anabolic/androgenic index.

17α-acetoxy-4-methylprogesterone which is of value on account of its progestational activity.

17α-hydroxy-4-methylprogesterone which is of value as an intermediate for the preparation of the 17α-acyl derivatives.

17α-acetoxy-4:6α-dimethylprogesterone.

4:16α-dimethylprogesterone which is of value on account of its progestational activity.

11β-hydroxy-17α:20:20:21-bis-methylenedioxy - 4 - methylpregn-4-en-3-one which is of value as an intermediate in the preparation of 4-methyl corticoids.

4-methyltestosterone β-phenylpropionate.

4-methyltestosterone phenoxyacetate.

4-methyltestosterone p-chlorophenoxyacetate which are of value on account of their favourable anabolic/androgenic ratios.

4-methyl-17α-caproyloxyprogesterone.

4-methyl-17α-acetoxy - 16 - methyleneprogesterone which are of value on account of their progestational activity.

4,17α-dimethyl-9α-fluoro - 11β,17β - dihydroxyandrost - 4-en-3-one which is of value on account of its favourable anabolic/androgenic index.

4-methyl-11β,17β-dihydroxyandrost-4-en-3-one which is of value on account of its favourable anabolic/androgenic index.

4-methyl-11α,17β-dihydroxyandrost-4-en-3-one which is an intermediate for the preparation of the 11β-hydroxy derivative into which it may be converted by oxidation to the 3,11,17-trione, NaBH₄ reduction and MnO₂ oxidation of the 3-hydroxy group.

4-methylandrost-4-ene-3,11,17-trione which is an intermediate for the preparation of the 11β-hydroxy derivative into which it may be converted by NaBH₄ reduction and MnO₂ oxidation of the 3-hydroxy group.

4-methyldesoxycorticosterone acetate, which is of value on account of its effect upon mineral balance.

The method of the invention may be applied to 4-thiomethyl-3-oxo-Δ⁴-steroids of the androstane, pregnane, cholane, cholestane, ergostane, stigmastane and spirostane series and their 19-nor and D-homo analogues. In general, the following groups do not interfere with the process of the reaction:

Hydroxy (or esterified hydroxyl) or alkoxy groups, in particular at positions C–6, 11, 12, 14, 16, 17, 20 and 21.
Oxo groups, in particular at positions C–11, 12, 17 and 20.
Carboxyl groups (or esterified carboxyl groups), in particular at C–21 and 24.
Alkyl groups containing up to five carbon atoms, in particular methyl groups at C–1, 2, 6, 7, 11, 14, 16 and 17 and ethyl groups at C–17.
Ketal groups, in particular ethylenedioxy or trimethylenedioxy at positions C–12, 17 and 20, bis-methylenedioxy at C–17:20:20:21 or substituted methylenedioxy at positions such as C–16:17.
Fluoro groups, in particular at position C–9.
Ethylenic linkages, in particular endocyclic linkages at positions such as 6:7, 7:8, 9:11, 11:12, 14:15, 17:20 and 22:23, and exocyclic linkage in particular such as are present in 16-methylene derivatives, also will not in general interfere with the process of the reaction.

The 4-organothiomethyl-3-oxo-Δ⁴-steroids employed as starting materials in the present invention are described in our copending application No. 852,971, filed November 16, 1959. They may be prepared by condensing the corresponding 3-oxo-Δ⁴-steroid with formaldehyde or paraformaldehyde and a thiol in the presence of a basic catalyst. It is not essential to isolate the 4-organothiomethyl compounds in crystalline form, as they are generally formed in high yield, so that the total product may be employed for the reaction of the present invention if so desired.

Desulphurisation of the 4-organothiomethyl starting material may be carried out by treating a solution of the organothiomethyl compound with Raney nickel of a suitable reactivity. The preferred solvent is acetone, but other ketonic solvents such as butan-2-one or cyclohexanone may be employed, either alone or diluted with an inert solvent such as a lower alkanol containing up to 5 carbon atoms. The reactivity of the Raney nickel must first be adjusted so as to prevent saturation of the 4:5-ethylenic linkage, which may occur if a highly active Raney nickel is used. Raney nickel, as ordinarily prepared, my be suitably deactivated by preliminary heating in the ketonic solvent, preferably acetone, in which the desulphurisation is to be effected, preferably in a slow stream of nitrogen to facilitate removal of the hydrogen gas which is evolved from the nickel. The thiomethyl compound is then added to the suspension of deactivated Raney nickel, and heating is continued until desulphurisation is completed, when the 4-methyl-3-oxo-Δ⁴-steroid may be isolated, for example, by filtration to remove the nickel and evaporation of the filtrate.

When the thiomethyl compound contains a readily oxidisable hydroxyl group, such as a 17β-hydroxyl group, it is advisable to protect this group by formation of a derivative such as the acetate or propionate prior to the desulphurisation reaction, in order to avoid partial oxidation of the hydroxyl group to an oxo group, which may occur, with concomitant reduction of a part of the ketonic solvent to the corresponding alcohol, under the catalytic influence of Raney nickel. The hydroxyl group may be regenerated after desulphurisation, if desired, by hydrolysis of the ester, for example, with alcoholic alkali.

Alternatively, when esterified products are required, it will be apparent to those skilled in the art that an ester group may be conveniently introduced into the thiomethyl compound. The acyl radical of the ester group may, for example, be derived from a hydrocarbon carboxylic acid containing up to 10 carbon atoms. Thus, for example, in the preparation of a 4-methyl-testosterone ester a 4-alkyl or arylthiomethyltestosterone may be converted by esterification into the appropriate 4-alkyl or arylthiomethyltestosterone ester, and the latter compound treated with Raney nickel to give the required 4-methyltestosterone ester. For the preparation of such products as 4-methyltestosterone zinc dust alkali-metal hydroxide forms a convenient reducing agent.

In applying the reaction to steroidal materials containing the ketol side-chain, such, for example, as cortisone, it is generally desirable to prevent the possibility of participation of the ketol side-chain in the process of the reaction. This is conveniently achieved by ketalisation of the 20-oxo group or preferably by conversion of the ketol side-chain into the bismethylenedioxy derivative. The protecting groups may subsequently be removed.

Following is a description by way of example of methods of carrying the invention into effect:

Example 1

Raney nickel (40 ml. of settled aqueous sludge) was washed by decantation with acetone (3 x 200 ml.), then covered with acetone (200 ml.), and the mixture was heated under reflux in nitrogen for 1 hour. 4-phenylthiomethyltestosterone acetate (4.4 g.), dissolved in acetone (60 ml.), was added to the nickel suspension, and heating was continued for 4 hours. The nickel was then removed by filtration, and washed on the filter with hot ethanol (100 ml.) followed by water (50 ml.). The combined filtrates were concentrated under reduced pressure until the product separated in solid form, then the solids were collected and purified from methanol, giving 4-methyltestosterone acetate, M.P. 158 to 160° C., $[\alpha]_D^{21}$ +102° (c., 0.21 in chloroform), $\lambda_{max}$. 249 mu ($\epsilon$=15,190) in ethanol.

Saponification of the foregoing acetate (0.5 g.) by heating under reflux for ½ hour with potassium hydroxide (0.2 g.) in 80% aqueous methanol (20 ml.), and purification from aqueous methanol, gave 4-methyltestosterone, M.P. 172 to 173° C., $[\alpha]_D^{22}$ +132° (c., 0.17 in chloroform).

The following esters of 4-methyltestosterone were prepared in similar manner:

Propionate, n-butyrate, n-valerate, iso-valerate (pentanoate), n-caproate (hexanoate), n-heptylate (heptanoate), n-caprylate (octanoate), n-oenanthate (nonanoate), n-caprate (decanoate), phenylacetate, β-phenylpropionate, γ-phenylbutyrate, phenoxyacetate, p-chlorophenoxyacetate.

Example 2

4-benzylthiomethyltestosterone (2 g.) in anhydrous pyridine (10 ml.) and acetic anhydride (5 ml.) was heated at 50° C. for 2 hours and the mixture was poured into water. The product was extracted with ether, and the ether extract was washed with water, dilute hydrochloric acid, water, sodium bicarbonate solution and water until neutral, dried over sodium sulphate and evaporated. The total acetylation product in acetone (40 ml.), was added to Raney nickel (20 ml. of sludge) which had been previously heated with acetone (100 ml.) under reflux in nitrogen for 1 hour. After being heated for a further 4 hours, the product was isolated as described in Example 1. Purification from methanol gave 4-methyltestosterone acetate, M.P. and mixed M.P. 158 to 160° C., with the sample prepared in Example 1.

Example 3

The procedure of Example 2 was repeated, 4-ethylthiomethyltestosterone replacing the 4-benzylthiomethyltestosterone. 4-methyltestosterone acetate was obtained as before.

Example 4

The procedure of Example 2 was repeated employing 4-butylthiomethyltestosterone. 4-methyltestosterone acetate was obtained as before.

Example 5

The procedure of Example 2 was repeated employing β-hydroxyethylthiomethyltestosterone. 4-methyltestosterone acetate was obtained as before.

Example 6

Testosterone (5.76 g.), ethane dithiol (0.92 ml.), formaldehyde (40% aqueous solution; 3 ml.), triethylamine (3 ml.) and ethanol (10 ml.) were heated under reflux for 60 hours, the product was isolated by pouring the mixture into a 5% aqueous solution of potassium hydroxide (200 ml.), extracting with chloroform, washing this solution, and evaporating the solvent, as a pale yellow oil, $\lambda_{max}$. 250 mu. Acetylation of this product, followed by desulphurisation as described in Example 2 gave 4-methyltestosterone acetate, M.P. 158 to 160° C.

Example 7

Toluene-3:4-dithiol (3.1 ml.) was substituted for ethane dithiol in Example 6. The thiomethylation product was obtained as a granular solid.

Acetylation and desulphurisation as described in Example 2 gave 4-methyltestosterone acetate, M.P. 158 to 160° C.

Example 8

The procedure of Example 1 was repeated employing 2α-methyl-4-phenylthiomethyltestosterone acetate.

Purification from methanol gave 2α-4-dimethyltestosterone acetate in plates, M.P. 188 to 190° C., $\lambda_{max}$. 248 mu ($\epsilon$=14,480) in ethanol, $[\alpha]_D^{21}$ +117° (c., 0.24 in chloroform).

Similarly the following esters were prepared from the corresponding 2α-methyl-4-phenylthiomethyltestosterone esters.

Propionate: plates from methanol, M.P. 136 to 138° C., $[\alpha]_D^{24}$ +109.5° (c., 0.42 in chloroform), $\lambda_{max}$. 247.5 mu ($\epsilon$=14,340) in ethanol.

β-Phenylpropionate: M.P. 135 to 138° C., $[\alpha]_D^{23}$ +116° (c., 0.48 in chloroform), $\lambda_{max}$. 248 mu ($\epsilon$=14,900) in ethanol.

p-Chlorophenoxyacetate: M.P. 133 to 134° C., $[\alpha]_D^{22}$ +107° (c., 0.46 in chloroform), $\lambda_{max}$. 229 mu ($\epsilon$=15,910), 248 mu ($\epsilon$=14,020), 278 mu ($\epsilon$=1640) and 287 mu ($\epsilon$=1210) in ethanol.

The foregoing acetate (100 mg.) in 80% aqueous methanol (10 ml.) containing potassium hydroxide (50 mg.) was heated under reflux for ½ hour, diluted to turbidity, and the solids which separated on cooling were purified from acetone/hexane (1:3). 2α:4-dimethyltestosterone formed prisms, M.P. 156 to 158° C., $[\alpha]_D^{25}$ +122° (c., 0.72 in chloroform), $\lambda_{max}$. 248.5 mu ($\epsilon$=14,400) in ethanol.

Example 9

17α-methyl-4-phenylthiomethyltestosterone was desulphurised according to Example 1, to give 4:17α-dimethyltestosterone, M.P. 141 to 142° C., $[\alpha]_D^{22}$ +85° (c., 0.22 in chloroform), $\lambda_{max}$. 249.5 mu ($\epsilon$=13,230) in ethanol.

17α-ethyl-4-methyltestosterone was prepared in a similar way.

Example 10

4-phenylthiomethylandrost-4-ene-3:17-dione (2.55 g.) in acetone (50 ml.) was added to a suspension of Raney nickel (22 ml.) in acetone (100 ml.) which had been previously heated under reflux for 1 hour. The heating was then continued for 4½ hours, when the nickel was removed by filtration, and washed with ethanol and water, and the combined filtrates were concentrated under reduced pressure. The separated solids were purified from acetone/hexane to give 4-methylandrost-4-ene-3:17-dione in needles, M.P. 138 to 140° C., $[\alpha]_D^{24}$ +207° (c., 0.72 in chloroform), $\lambda_{max.}$ 248.5 mu ($\epsilon$=15,320) in ethanol.

*Example 11*

6α-methyl - 4 - phenylthiomethylandrost - 4 - ene-3:17-dione was desulphurised as described in Example 10 and gave 4:6α-dimethylandrost-4-ene-3:17-dione, which separated from acetone/hexane (1:2) in prisms, M.P. 176 to 178° C., $\lambda_{max.}$ 249 mu ($\epsilon$=15,030) in ethanol.

*Example 12*

Raney nickel (11 ml. of settled sludge) was washed by decantation with acetone (3 x 100 ml.), then heated with acetone (45 ml.) under reflux in nitrogen. After 1 hour 4-phenylthiomethylprogesterone (1 g.) in acetone (25 ml.) was added, and heating was continued for 4 hours. The nickel was removed by filtration, washed on the filter with hot ethanol (50 ml.) and water (30 ml.), and the combined filtrates were concentrated under reduced pressure until the product separated as a solid. Purification from methanol gave 4-methylprogesterone in rods, M.P. 164 to 166° C., $[\alpha]_D^{25}$ +212.5° (c., 0.29 in chloroform), $\lambda_{max.}$ 249 mu ($\epsilon$=15,320) in ethanol, $\gamma_{max.}$ 1709, 1671 and 1606 cm.$^{-1}$ in chloroform.

*Example 13*

4-phenylthiomethylpregna-4:9(11)-diene - 3:20 - dione was desulphurised according to Example 12 to give 4-methylpregna-4:9(11)-diene-3.20-dione, which separated from acetone/hexane (1:10) in needles, M.P. 146 to 149° C., $\lambda_{max.}$ 249 mu ($\epsilon$=14,800) in ethanol, $[\alpha]_D^{24}$ +154° (c., 0.98 in chloroform).

*Example 14*

Desulphurisation of 17α-acetoxy-4-phenylthiomethylprogesterone (250 mg.) with Raney nickel (5 ml.) as described in Example 12, and purification from acetone/hexane (1:2) gave 17α-acetoxy-4-methylprogesterone in prisms, M.P. 142 to 144° C. or 172 to 175° C., $[\alpha]_D^{24}$ +80° (c., 0.63 in chloroform), $\lambda_{max.}$ 248.5 mu ($\epsilon$=13,720 in ethanol), $\gamma_{max.}$ 1736, 1722, 1673 and 1608 cm.$^{-1}$ in carbon disulphide.

Saponification of the 17-acetate with 2% methanolic potassium hydroxide gave 17α-hydroxy-4-methylprogesterone, M.P. 239 to 241° C., $[\alpha]_D^{21}$ +99° (c., 0.97 in chloroform), $\lambda_{max.}$ 250 mu ($\epsilon$=15,540) in ethanol.

*Example 15*

Desulphurisation of 17α:20:20:21-bismethylenedioxy-4-phenylthiomethylpregn-4-ene-3:11-dione (4 g.) with Raney nickel (40 ml.) as described in Example 1, and purification from acetone/hexane (1:2) gave 17α:20:20:21-bismethylenedioxy-4-methylpregna-4-ene-3:11-dione in plates, M.P. 279 to 284° C. $[\alpha]_D^{25}$ +87° (c., 0.63 in chloroform), $\lambda_{max.}$ 248 mu ($\epsilon$=13,700) in ethanol, $\gamma_{max.}$ 1706, 1673 and 1601 cm.$^{-1}$ in carbon tetrachloride.

The foregoing bismethylenedioxy compound (1 g.) in 60% aqueous formic acid (40 ml.) was heated at 100° C., for 20 minutes and then poured into water. Purification of the precipitated solids from acetone/hexane (1:1) gave 4-methylcortisone, M.P. 229 to 233° C., $[\alpha]_D^{21}$ +212° (c., 0.10 in chloroform), $\lambda_{max.}$ 248 mu ($\epsilon$=14,050) in ethanol.

*Example 16*

Desulphurisation of 4-phenylthiomethyl-25D-spirost-4-en-3-one as described in Example 1 gave 4-methyl-25D-spirost-4-one in fine needles, M.P. 167 to 170° C., $[\alpha]_D^{25}$ ±0° (c., 0.35 in chloroform), $\lambda_{max.}$ 251 mu ($\epsilon$=17,620) in ethanol, $\gamma_{max.}$ 1669 and 1602 cm.$^{-1}$ in carbon tetrachloride.

*Example 17*

The procedure of Example 2 was repeated employing 4-methylthiomethyltestosterone. 4-methyltestosterone acetate was obtained as before.

*Example 18*

The procedure of Example 2 was repeated employing 4-n-decylthiomethyltestosterone. 4-methyltestosterone acetate was obtained as before.

*Example 19*

The procedure of Example 2 was repeated employing 4-n-dodecylthiomethyltestosterone. 4-methyltestosterone acetate was obtained as before.

*Example 20*

The procedure of Example 2 was repeated employing 4-cyclohexylthiomethyltestosterone. 4-methyltestosterone acetate was obtained as before.

*Example 21*

The procedure of Example 2 was repeated employing 4-p-tolylthiomethyltestosterone. 4-methyltestosterone acetate was obtained as before.

*Example 22*

The procedure of Example 2 was repeated employing 4-allylthiomethyltestosterone. 4-methyltestosterone acetate was obtained as before.

*Example 23*

The procedure of Example 2 was repeated employing 4-furfurylthiomethyltestosterone. 4-methyltestosterone acetate was obtained as before.

*Example 24*

The procedure of Example 2 was repeated employing 4-(naphthalene-2'-thiomethyl)-testosterone. 4-methyltestosterone acetate was obtained as before.

*Example 25*

The procedure of Example 6 was repeated, decane-1:10-dithiol replacing ethane dithiol. 4-methyltestosterone acetate was obtained as before.

*Example 26*

The procedure of Example 2 was repeated employing 17β - hydroxy - 4 - phenylthiomethylandrosta - 4:6 - dien-3-one. Purification of the product from (80%) aqueous methanol gave 17β-acetoxy-4-methylandrosta-4:6-dien-3-one in needles, M.P. 154 to 155° C., $[\alpha]_D^{22}$ +87° (c., 0.11 in chloroform), $\lambda_{max.}$ 289 mu ($\epsilon$=29,180) in ethanol.

Saponification of the foregoing acetate as in Example 1 gave 17β-hydroxy-4-methylandrosta-4:6-dien-3-one which separated as prisms from aqueous methanol, M.P. 132 to 134° C., $\lambda_{max.}$ 289.5 mu ($\epsilon$=29,440) in ethanol.

*Example 27*

The procedure of Example 2 was repeated employing 6α-methyl-4-phenylthiomethyltestosterone. Purification of the product from methanol gave 4:6α-dimethyltestosterone acetate, M.P. 155 to 158° C., $\lambda_{max.}$ 250 mu ($\epsilon$=14,730) in ethanol. Similarly was prepared 4,6α-dimethyltestosterone propionate, needles from methanol, M.P. 126 to 128° C., $[\alpha]_D^{20}$ +8.5° (c., 0.42 in chloroform) $\lambda_{max.}$ 250 mu ($\epsilon$=13,935) in ethanol and 4,6α-dimethyltestosterone β-phenylpropionate, M.P. 146 to 148° C., $[\alpha]_D^{22}$ +24° (c., 0.38 in chloroform) $\lambda_{max.}$ 251 mu ($\epsilon$=13,500) in ethanol.

Saponification of the foregoing acetate as in Example 1 gave 4:6α-dimethyltestosterone, which separated from acetone/hexane (1:2) in prisms, M.P. 228 to 230° C., $[\alpha]_D^{25}$ +14° (c., 0.22 in chloroform), $\lambda_{max.}$ 251 mu ($\epsilon$=13,890) in ethanol.

Example 28

The procedure of Example 2 was repeated, employing 4-phenylthiomethyl-D-homotestosterone, when the product was 4-methyl-D-homotestosterone acetate. Saponification as in Example 1 gave 4-methyl-D-homotestosterone, $\lambda_{max.}$ 249 mu.

Example 29

6-methyl-4-phenylthiomethylandrosta-4:6-diene-3:17-dione was desulphurised as described in Example 10, to give 4:6-dimethylandrosta-4:6-diene-3:17-dione.

Example 30

4-phenylthiomethylcholest-4-en-3-one was desulphurised according to Example 1, and gave 4-methylcholest-4-en-3-one which separated from ethanol in prisms, M.P. 101 to 103° C., $[\alpha]_D^{22}$ +108° (c., 0.35 in chloroform), $\lambda_{max.}$ 251 mu ($\epsilon$=15,900) in ethanol.

Example 31

4-phenylthiomethylstigmasta-4:22-dien-3-one was desulphurised according to Example 1, and gave 4-methylstigmasta-4:22-dien-3-one, prisms from ethanol, M.P. 83 to 86° C., $[\alpha]_D^{22}$ +61° (c., 0.77 in chloroform), $\lambda_{max.}$ 252 mu ($\epsilon$=14,990) in ethanol, $\gamma_{max.}$ 3061, 1676 and 1600 cm.$^{-1}$ in carbon tetrachloride 972 cm.$^{-1}$ in carbon disulphide.

Example 32

4-phenylthiomethylergosta-4:7:22-trien-3-one was desulphurised according to Example 1 and gave 4-methylergosta-4:7:22-trien-3-one prisms from ethanol, M.P. 125 to 127° C., $[\alpha]_D^{24}$ +59 (0.42 in chloroform) $\lambda_{max.}$ 247.5 mu ($\epsilon$=18,590) in ethanol $\gamma_{max.}$ 1668 and 1603 cm.$^{-1}$ in carbon tetrachloride.

Example 33

Methyl 3-oxo-4-phenylthiomethylchol-4-en-24-oate was desulphurised according to Example 1 and gave methyl-3-oxo-4-methylchol-4-en-24-oate leaflets from methanol, M.P. 100 to 103° C., $[\alpha]_D^{23}$ +80° (c., 0.89 in chloroform) $\lambda_{max.}$ 250 mu ($\epsilon$=13.980) in ethanol.

Example 34

The procedure of Example 2 was repeated employing 7β-methyl-4-phenylthiomethyltestosterone, when the product was 4:7β-dimethyltestosterone acetate. Saponification as in Example 1 gave 4:7β-dimethyltestosterone.

Example 35

The procedure of Example 14 was repeated employing 17α-caproyloxy-4-phenylthiomethylprogresterone, when the product was 17α-caproyloxy-4-methylprogesterone, needles from acetone/hexane (1:6), M.P. 122 to 124° C., $[\alpha]_D$ (c., 0.58 in chloroform), $\lambda_{max.}$ 248.5 mu ($\epsilon$=14,740) in ethanol. $\gamma_{max.}$ 1734, 1719, 1669 and 1610 cm.$^{-1}$ in carbon tetrachloride.

The following other 17α-esters were prepared in the same way:

Propionate, n-butyrate, iso-butyrate, n-valerate, iso-valerate.

Example 36

The procedure of Example 12 was repeated employing 17α-acetoxy-6α-methyl-4-phenylthiomethylprogesterone, when the product was 17α-acetoxy-4:6α-dimethylprogesterone, M.P. about 137° C., $[\alpha]_D^{24}$ +5° (c., 0.25 in chloroform), $\lambda_{max.}$ 249 ($\epsilon$=12,975) in ethanol.

Saponification of the 17α-acetate with 2% methanolic potassium hydroxide gave 17α-hydroxy-4:6α-dimethylprogresterone.

Example 37

16α-methyl-4-phenylthiomethylprogresterone was desulphurised according to Example 12, when the product was 4:16α-dimethylprogesterone, which separated from acetone/hexane (1:2) in leaflets, M.P. 152 to 154° C., $[\alpha]_D^{25}$ +173° (c., 0.35 in chloroform), $\lambda_{max.}$ 249 mu ($\epsilon$=16,270) in ethanol.

Example 38

16α:17α-dimethylmethylenedioxy-4-phenylthiomethylprogesterone treated according to Example 12 gave 4-methyl-16α:17α-dimethylmethylenedioxyprogresterone which separated from aqueous methanol in needles, M.P. 217 to 220° C., $\lambda_{max.}$ 248.5 mu ($\epsilon$=16,000) in ethanol.

Example 39

4-phenylthiomethylpregna-4:11-diene-3:20-dione was desulphurised according to Example 12 and gave 4-methylpregna-4:11-diene-3:20-dione.

Example 40

4-phenylthiomethyl-19-nortestosterone was acetylated and desulphurised according to Example 2 to give 4-methyl-19-nortestosterone acetate which separated from aqueous methanol in prisms, M.P. 122 to 123° C., $[\alpha]_D^{24}$ +51° (c., 0.43 in chloroform), $\lambda_{max.}$ 248 mu ($\epsilon$=16,230) in ethanol.

Saponification as in Example 1 gave 4-methyl-19-nortestosterone, M.P. 156 to 157° C., $[\alpha]_D^{21}$ +50° (c., 0.47 in chloroform), $\lambda_{max.}$ 250 mu ($\epsilon$=15,350) in ethanol.

Example 41

1-methyl-4-phenylthiomethyl-19-nortestosterone was acetylated and desulphurised according to Example 2 to give 1:4-dimethyl-19-nortestosterone acetate.

Saponification as in Example 1 gave 1:4-dimethyl-19-nortestosterone.

Example 42

9α-fluoro-17α:20:20:21-bis-methylenedioxy-4-phenylthiomethylpregn-4-ene-3:11-dione was desulphurised according to Example 12 to give 9α-fluoro-17α:20:20:21-bis-methylenedioxy-4-methylpregn-4-ene-3:11-dione.

Removal of the protecting bis-methylenedioxy group as in Example 15 gave 9α-fluoro-4-methylcortisone.

Example 43

14α-methyl-17α:20:20:21-bis-methylenedioxy-4-phenylthiomethylpregn-4-ene-3:11-dione was desulphurised according to Example 12 to give 4:14α-dimethyl-17α:20:20:21-bis-methylenedioxypregn-4-ene-3:11-dione.

Removal of the protecting bis-methylenedioxy group as in Example 15 gave 4:14α-dimethylcortisone.

Example 44

14α-methyl-4-phenylthiomethylcortisone was acetaylated and desulphurised according to Example 2 to give 4:14α-dimethylcortisone acetate.

Saponification of the foregoing compound (180 mg.) with potassium bicarbonate (60 mg.) in 80% aqueous methanol (12 ml.) under reflux for 20 minutes, gave 4:14β-dimethylcortisone identical with the sample prepared in Example 43.

Example 45

20ξ-hydroxy-4-phenylthiomethylpregn-4-en-3-one was acetylated and desulphurised according to Example 2 to give 20ξ-acetoxy-4-methylpregn-4-en-3-one.

Saponification according to Example 1 gave 20ξ-hydroxy-4-methylpregn-4-en-3-one.

Example 46

21-hydroxy-4-phenylthiomethylpregna-4:17(20)-dien-3-one was acetylated and desulphurised according to Example 2 to give 21-acetoxy-4-methylpregna-4:17(20)-dien-3-one.

Saponification according to Example 1 gave 21-hydroxy-4-methylpregna-4:17(20)-dien-3-one.

Example 47

3-oxo-4-phenylthiomethylpregna-4:17(20)-dien-21-oic acid was desulphurised according to Example 10 to give 3-oxo-4-methylpregna-4:17(20)-dien-21-oic acid.

Example 48

11β - hydroxy-17α:20:20:21 - bis - methylenedioxy - 4 - phenylthiomethylpregn-4-en-3-one, was desulphurised according to Example 12 to give 11β-hydroxy-17α:20:20:21-bis-methylenedioxy-4-methylpregn-4-en-3-one, which separated from chloroform/ethanol (1:2) in prisms, M.P. 207 to 209° C., $\lambda_{max}$. 250.5 mu ($\epsilon$=14,220) in ethanol.

Removal of the protecting bis-methylenedioxy group according to Example 15 gave 11β:17α:21-trihydroxy-4-methylpregn-4-ene-3:20-dione (4-methylhydrocortisone).

Example 49

14α-hydroxy-4-phenylthiomethylprogesterone was desulphurised according to Example 12 to give 14α-hydroxy-4-methylprogesterone.

Example 50

17α:20:20:21 - bis-methylenedioxy-4-phenylthiomethylpregna-4:14-diene-3:11-dione was desulphurised according to Example 12 to give 17α:20:20:21-bis-methylenedioxy-4-methylpregna-4:14-diene-3:11-dione.

Removal of the protecting bis-methylenedioxy-group according to Example 15 gave 17α:21-dihydroxy-4-methylpregna-4:14-diene-3:11:20-trione.

Example 51

11β - hydroxy - 11α - methyl - 4 - phenylthiomethyl - testosterone was acetylated and desulphurised according to Example 2 to give 11β-hydroxy-4:11α-dimethyltestosterone-17-acetate.

Saponification according to Example 1 gave 11β-hydroxy-4:11α-dimethyltestosterone.

Example 52

20:20 - ethylenedioxy - 4 - phenylthiomethylpregn - 4 - en-3-one was desulphurised according to Example 12 to give 20:20-ethylenedioxy-4-methylpregn-4-en-3-one.

Example 53

11α-hydroxy-4-phenylthiomethylprogesterone was desulphurised by the process of Example 12, and the product purified from acetone/hexane and from aqueous methanol (60%) to give 11α-hydroxy-4-methylprogesterone, as flakes, M.P. 168 to 171° C., $[\alpha]_D^{26}$ +146° (c., 0.39 in chloroform), $\lambda_{max}$. 250.5 mu ($\epsilon$=12,060) in ethanol.

Example 54

4-phenylthiomethylpregn-4-ene-3,11,20-trione was desulphurised by the process of Example 12 and the product purified from acetone/hexane (1:3) to give 4-methylpregn-4-ene-3,11,20-trione as prisms, M.P. 179 to 181° C., $[\alpha]_D^{23}$ +277° (c., 0.50 in chloroform), $\lambda_{max}$. 248 mu ($\epsilon$=13,855) in ethanol, $\gamma_{max}$. 1700, 1669, 1601 cm.$^{-1}$ in carbon tetrachloride.

Example 55

4-phenylthiomethyltestosterone (5 g.) in anhydrous pyridine (50 ml.) at 0° C., was treated dropwise with β-phenylpropionyl chloride, then the solution was left to stand at room temperature for 3 hours, and poured into saturated sodium hydrogen carbonate solution, shaken to destroy excess acid chloride, and the product extracted with ether. The ether was washed with water, dilute sulphuric acid, and water until neutral, dried and evaporated. 4-phenylthiomethyltestosterone β-phenylpropionate was obtained as a crystalline solid.

Desulphurisation of the foregoing compound according to Example 1 gave 4-methyltestosterone-β-phenylpropionate, needles, M.P. 143 to 145° C.

Example 56

The procedure of Example 55 was repeated employing phenoxyacetyl chloride instead of β-phenylpropionyl chloride.

4-phenylthiomethyltestosterone phenoxyacetate was obtained, and was converted by desulphurisation into 4-methyltestosterone phenoxyacetate, M.P. 164° C.

Example 57

The procedure of Example 55 was repeated employing p-chlorophenoxyacetyl chloride. 4-phenylthiomethyltestosterone p-chlorophenoxyacetate was obtained, and was converted by desulphurisation into 4-methyltestosterone p-chlorophenoxyacetate, M.P. 169 to 170° C.

Example 58

11α - hydroxy - 4 - phenylthiomethyltestosterone, treated according to the process of Example 12, gave a product which was purified from ethyl acetate to give 11α-hydroxy-4-methyltestosterone as solvated crystals, M.P. 115 to 130° C., with frothing, or M.P. about 180° C. after drying at 100° C. in vacuo, $[\alpha]_D^{21}$ +66° (c., 0.60 in chloroform) $\lambda_{max}$. 250.5 mu ($\epsilon$=12,900) in ethanol, $\gamma_{max}$. 1658, 1602 cm.$^{-1}$ in methylene chloride.

Example 59

4-phenylthiomethylandrost-4-ene-3,11,17-trione, treated according to the process of Example 12, gave 4-methylandrost-4-ene-3,11,17-trione as prisms (from acetone/hexane 1:4), M.P. 166 to 168° C., $[\alpha]_D^{20}$ +307° (c., 0.85 in chloroform), $\lambda_{max}$. 247.5 mu ($\epsilon$=12,670) in ethanol, $\gamma_{max}$. 1746, 1711, 1669 and 1606 cm.$^{-1}$ in carbon tetrachloride.

Example 60

11β - hydroxy - 4 - phenylthiomethyltestosterone, treated according to the process of Example 12, gave 11β-hydroxy-4-methyltestosterone, flakes from methylene chloride/hexane, M.P. about 256° C., $\gamma_{max}$. 3400, 1650, 1605 cm.$^{-1}$ in "Nujol," $\lambda_{max}$. 251 mu ($\epsilon$=12,960) in ethanol.

Example 61

9α - fluoro - 11β,17β - dihydroxy - 17α - methyl - 4 - phenylthiomethylandrost-4-en-3-one, treated according to the process of Example 12, gave 9α-fluoro-11β,17β-dihydroxy-4,17α-dimethylandrost-4-en-3-one, needles from aqueous methanol, M.P. 213 to 216° C., $[\alpha]_D^{24}$ +111° (c., 0.42 in chloroform, $\lambda_{max}$. 249 mu ($\epsilon$=16,440) in ethanol.

Example 62

Ethyl 3 - oxo - 4 - phenylthiomethylpregna - 4,17(20) - dien-21-oate, treated according to the process of Example 12, gave ethyl 3-oxo-4-methylpregna-4,17(20)-dien-21-oate, flakes from aqueous methanol (60%), M.P. 130 to 132° C., $[\alpha]_D^{23}$ +109° (c., 0.14 in chloroform), $\lambda_{max}$. 225 mu ($\epsilon$=18,670) and 240 to 245 mu ($\epsilon$=17,820) in ethanol, $\gamma_{max}$. 1708, 1665, 1604 cm.$^{-1}$ in carbon tetrachloride.

Example 63

16α - hydroxy - 4 - phenylthiomethyltestosterone, treated according to the process of Example 2, gave 16α,17β-diacetoxy-4-methylandrost-4-en-3-one.

Saponification of the foregoing diacetate with potassium hydroxide in aqueous methanol gave 16α-hydroxy-4-methyltestosterone.

Example 64

16α,17α - benzylidenedioxy - 4 - phenylthiomethylprogesterone, treated according to the process of Example 12, gave 16α,17α-benzylidenedioxy-4-methylprogesterone.

Example 65

20,20 - ethylenedioxy - 17α - hydroxy - 4 - (p - tolyl - thiomethyl)pregn-4-en-3-one, treated according to the process of Example 12, gave 20,20-ethylenedioxy-17α-hydroxy-4-methylpregn-4-en-3-one, needles from methylene chloride/methanol (1:10), M.P. 228 to 230° C., $[\alpha]_D^{21}$ +77° (c., 0.55 in chloroform), $\lambda_{max}$ 250 mu ($\epsilon$=14,530) in ethanol.

The foregoing ethylenedioxy compound was treated with 90% aqueous acetic acid overnight at room temperature, and the product purified from methylene chloride/methanol to give 17α-hydroxy-4-methylprogesterone, M.P. 239 to 241° C., $[\alpha]_D^{21}$ +99° (c., 0.97 in chloroform), $\lambda_{max}$ 250 mu ($\epsilon$=15,540) in ethanol.

Example 66

17α-acetoxy-16-methylene - 4 - phenylthiomethylpregn-4-ene-3,20-dione, treated according to the process of Example 12, gave 17α-acetoxy-4-methyl-16-methylenepregn-4-ene-3,20-dione, flakes from aqueous methanol, M.P. 212 to 214° C., $[\alpha]_D^{25}$ −43° (c., 0.8 in chloroform), $\lambda_{max}$ 249 mu ($\epsilon$=15,490) in ethanol.

Example 67

7,7-dimethyl-4-phenylthiomethylcholest-4-en - 3 - one, treated according to the process of Example 12, gave 4,7,7-trimethylcholest-4-en-3-one.

Example 68

21-acetoxy-20,20-ethylenedioxy - 4 - phenylthiomethylpregn-4-en-3-one, treated according to the process of Example 12 gave 21-acetoxy-20,20-ethylenedioxy-4-methylpregn-4-en-3-one, $\lambda_{max}$ 249 mu.

The foregoing compound was treated with potassium carbonate in 80% aqueous methanol under reflux for 2 hours to give 21-hydroxy-20,20-ethylenedioxy-4-methylpregn-4-en-3-one.

The last compound, in acetone containing 1% of N. aqueous hydrochloric acid was converted into 21-hydroxy-4-methylpregn-4-ene-3,20-dione which was converted by acetylation with acetic anhydride/pyridine (1:1) overnight at room temperature into 21-acetoxy-4-methylpregn-4-ene-3,20-dione, purified from methanol to give prisms, M.P. 175 to 176° C., $[\alpha]_D^{29}$ +193° (c., 0.20 in chloroform), $\lambda_{max}$ 249 mu ($\epsilon$=15,000) in ethanol; $\gamma_{max}$ 1755, 1730, 1672 and 1611 cm.$^{-1}$ in carbon tetrachloride.

Example 69

Zinc dust (60 g.) was washed with dilute hydrochloric acid (50 ml. concentrated acid +100 ml. freshly boiled and cooled distilled water) then washed twice with freshly boiled and cooled distilled water (100 ml.) and twice with acetone (200 ml.). To this zinc was added 4-phenylthiomethyltestosterone (15 g.) in acetone (100 ml.), and potassium hydroxide (6 g.).

This mixture was stirred and heated under reflux for 5 hours, filtered and the solids well-washed with acetone. The acetone filtrates were concentrated under reduced pressure and poured into water (3 litres). The precipitated solids were collected and dried, then treated with acetic anhydride (40 ml.) and pyridine (20 ml.) at 90° C. for 1.5 hours, and the product precipitated in cold water and dried. Purification from methanol gave 4-methyltestosterone acetate, M.P. 158 to 160° C.

Example 70

4-(β-carboxyethylthiomethyl)-testosterone, treated according to the process of Example 2, gave 4-methyltestosterone acetate, M.P. 158 to 160° C.

Example 71

4-(β - methoxycarboxylethylthiomethyl) - testosterone, treated according to the process of the process of Example 2, gave 4-methyltestosterone acetate, M.P. 158 to 160° C.

Example 72

4-(β - ethylthiomethylthiomethyl) - testosterone, treated according to the process of Example 2, but employing twice the quantity of Raney nickel, gave 4-methyltestosterone acetate.

We claim:

1. A method for the preparation of 4-methyl-3-oxo-Δ⁴-steroids which comprises reacting a 4-organothiomethyl-3-oxo-Δ⁴-steroid with a reducing agent selected from the group consisting of deactivated Raney nickel and zinc in the presence of an alkali base to achieve reductive fission of the sulphur-containing group.

2. A method as claimed in claim 1 wherein the reducing agent is Raney nickel suspended in a ketonic solvent.

3. A method as claimed in claim 2 wherein the Raney nickel is deactivated by preliminary heating in a ketonic solvent and the 4-organothiomethyl-3-oxo-Δ⁴-steroid is added to the resulting suspension of deactivated Raney nickel.

4. A method as claimed in claim 1 wherein the reducing agent is zinc dust and alkali metal hydroxide.

5. 4:6α-dimethyltestosterone having a melting point of 228–230° C., $[\alpha]_D^{25}$ +14° (c., 0.22 in chloroform), $\lambda_{max}$ 251 mu ($\epsilon$=13,890) in ethanol, and acyl esters thereof, wherein the acyl group is derived from a hydrocarbon carboxylic acid containing up to 10 carbon atoms.

References Cited in the file of this patent

UNITED STATES PATENTS

| 2,753,360 | Kaspar et al. | July 3, 1956 |
| 2,891,075 | Sondheimer et al. | June 16, 1959 |

FOREIGN PATENTS

| 737,773 | Great Britain | Sept. 28, 1955 |

OTHER REFERENCES

Fieser et al.: "Natural Products Related to Phenanthrene," 3rd Edition (1949), page 422.

Feshmann: "Endocrinology," vol. 57, pages 646–57 (1955).

Neher et al.: "Helv. Chim. Acta," vol. 39 (1956), pages 2062–88.

Ringold et al.: "Journal of Organic Chemistry," vol. 21 (1956) pages 1333–1335.

Sondheimer et al.: "J.A.C.S.," vol. 79 (1957), pages 2906 to 2910.

Ringold et al.: "Journal of Organic Chemistry," vol. 22 (1957), pages 99–100.

Babcock et al.: "Journal of American Chemical Society," vol. 80 (1958), pages 1904–5.

Ringold et al.: "Journal of American Chemical Society," vol. 81 (1959), pages 427–9.